United States Patent Office 2,891,857
Patented June 23, 1959

2,891,857

METHOD OF PREPARING REFRACTORY METALS

Russell B. Eaton, Wilmington, Del., assignor to E. I. du Pont de Nemours and Company, Wilmington, Del., a corporation of Delaware No Drawing. Application August 2, 1956
Serial No. 601,604

15 Claims. (Cl. 75—84.5)

This invention relates to the production of refractory metals by reduction of their halides, and more particularly to a novel and improved process in which a higher-valent halide of a refractory metal, hydrogen, and an alkali metal halide and/or alkaline earth metal halide are commingled at elevated temperatures to produce a composition capable of yielding the refractory metal when it is subsequently commingled with conventional reducing agents, such as sodium or magnesium.

This application is a continuation-in-part of my copending application Serial No. 281,473, filed April 9, 1952 now abandoned.

The production of refractory metals, such as titanium metal, by reduction of a halide, such as $TiCl_4$, with a reducing metal is well known. Thus, U.S. Patent 2,205,854 adds liquid titanium tetrachloride to a reaction vessel containing molten magnesium metal in the presence of an inert rare gas to obtain a sponge metal product embedded in by-product magnesium chloride. Great quantities of heat are evolved in this reaction and this heat, unless dissipated, causes reaction chamber temperatures which cannot be tolerated in iron equipment.

Similarly, other methods for the preparation of titanium have been proposed; as, for example, the thermal composition of titanium iodide, or the reduction of titanium tetrachloride by sodium or other alkali metals, as exemplified by U.S. Patent 2,148,345. In this patent, the tetrachloride is introduced below the surface of a molten salt through which it rises and reacts with molten sodium floating thereon. The $TiCl_4$ reacts with the sodium to give titanium sponge which must be separated from reaction-by-product alkali metal salt. Considerably more heat is generated in this sodium process than is encountered in the magnesium method which has been referred to.

These prior processes also yield a titanium product which adheres to the walls of the reaction chamber and these processes must be operated batch-wise rather than by continuous flow operations which are more advantageous and economical for commercial exploitation.

It is among the objects of this invention to provide a novel method for producing refractory metals which is more economical than prior batch processes and in which recourse can be readily had to the use of a less expensive reducing agent, such as hydrogen. A further object is to provide a refractory metal subhalide-alkali metal salt or alkaline earth metal salt composition which can be commingled with a conventional reducing agent to produce the desired refractory metal. A still further object is to provide a continuous, step-wise process for the reduction of refractory metal halides, especially those of titanium and niobium. Further objects and advantages of the invention will be evident from the ensuing description thereof.

These and other objects are attained in this invention which comprises as a primary step preparation of a reducible refractory metal subhalide-salt composition by reducing with hydrogen, in the presence of alkali metal salts and/or alkaline earth metal salts, the halide of said refractory metal in its highest valent state, and recovering a refractory metal subhalide-alkali metal and/or alkaline earth metal salt composition as a homogeneous product. For purposes of brevity in the ensuing description, this homogeneous product may be more simply referred to as a refractory metal subhalide-salt composition. Still further objects are attained by subjecting said composition to reduction with an active reducing metal to recover the desired refractory metal. The subhalide-forming refractory metals referred to above include titanium, vanadium, niobium, molybdenum, tantalum and tungsten.

In a more specific and preferred embodiment, the invention comprises reacting titanium tetrachloride with hydrogen in the presence of an alkali metal halide, preferably the chloride, in a closed reaction zone maintained at a temperature above the melting point of the resulting product, and then subjecting said product to reduction with an active reducing metal such as magnesium, to obtain the desired titanium metal product.

The reduction operation can be illustrated by the reaction, in the presence of sodium chloride, of hydrogen and titanium tetrachloride, the chloride of titanium being less expensive than analogous titanium tetrahalides, such as titanium tetrabromide, titanium tetrafluoride, and titanium tetraiodide, which are also contemplated as useful herein. The titanium tetrachloride, hydrogen, and the alkali or alkaline earth metal halide are caused to react under temperature conditions at which a simultaneous interaction occurs between $H_2$, $TiCl_4$ and salt to form a homogeneous molten composition of salt and subhalides, e.g., a liquid salt composition in which the titanium halide contains from 2 to 3 atoms of chlorine per atom of titanium. The refractory metal halide and the hydrogen can be added simultaneously to the reactor containing the solvent salts while temperatures therein are maintained sufficiently high to keep some of the salt composition in substantially liquid state. The upper temperature limit is not critical, but for practical purposes it should be below the boiling point of the end product salt composition. Preferred temperatures are usually above about 450° C. and within a range of from about 750 to 850° C.

When operating at 850° C. with a substantial excess of hydrogen and adding one part by weight of sodium chloride for each part by weight of titanium tetrachloride used, a composition results in which the titanium has 2.6 atoms of chlorine per titanium atom. X-ray examination of this product reveals that it is a mixture of titanium trichloride, titanium dichloride, sodium chloride and an undetermined chloride compound of titanium and sodium.

The alkali metal salt or alkaline earth metal salt may be either a single compound or a mixture of the specific compounds which are included within the class of alkali metal halides and alkaline earth metal halides. Specific materials which may be used include sodium chloride, lithium chloride, potassium chloride, calcium chloride, magnesium chloride, barium chloride and their corresponding iodides and bromides. The amounts of salt or salts used can vary within relatively wide limits. The mole ratio of salt to the starting refractory metal halide may be about 12 to 1, but for titanium preferably is kept at about 1.4 to 1. The upper limit on the amount of hydrogen introduced into the salt along with the refractory metal halide is not critical. For practical purposes, the amount of hydrogen should be slightly in excess of the stoichiometric quantity so as to insure the availability of at least a stoichiometric amount for reaction. Stoichiometric amounts are based upon the reduction of $TiCl_4$ to $TiCl_2$ according to the following equation:

$$TiCl_4 + H_2 \rightarrow TiCl_2 + 2HCl$$

Advantageously, the invention provides a homogeneous product through virtually 100% conversion of $TiCl_4$ to the subchloride in a single pass through the system. The product then can be commingled with a conventional metal reducing agent for reaction at elevated temperatures to give greater yields of a refractory metal than heretofore possible in prior methods wherein the same amounts of starting refractory metal halide and hydrogen are brought together and the resultant reaction products are introduced into a salt bath for final reduction. In previous hydrogen reductions in the absence of alkali or alkaline earth metal salts, large excesses of hydrogen are required and a low reaction rate and poor conversion (in the range of 10% to 20%) are attained. Furthermore, recourse to repeated undesired recycling of $TiCl_4$ is required.

Since the end product refractory metal subhalide-salt composition is at an elevated temperature immediately after the hydrogen reduction it is ideally suited for further reduction to elemental metal by contacting said composition with at least a stoichiometric amount, based on the chlorine content of the titanium subhalide, of a reducing metal, such as magnesium, at temperatures preferably from 700–1100° C.

To a clearer understanding of the invention, the following examples are given. These are illustrative of and not in limitation of my invention.

*Example I*

Two absorption towers or columns, in series, containing molten sodium chloride at 850° C., were employed in this example. These columns were constructed of fused silica and provided with inlets near the bottom and outlets at their tops, the outlet of the first column being connected to the inlet of the second. Each absorption tower was 1.5" in diameter and 10" high. Sodium chloride was placed in each as the absorption agent. The depth of molten sodium chloride in the first column was 4 inches and in the second column was 8 inches. The columns contained 200 and 400 grams of pure sodium chloride, respectively. A mixture containing 42 parts by weight of gaseous titanium tetrachloride per part by weight of hydrogen was passed through the columns of the apparatus in series while the latter was maintained at a temperature of 850° C. Uncondensed reaction gases were exited to the atmosphere. A total of 195.6 grams of $TiCl_4$ was introduced. At the conclusion of the run, it was found by analytical determinations that 97.4% of the titanium tetrachloride was converted to lower chlorides and absorbed in the salt within the columns. The salt in the first column analyzed 10.82% titanium, while the salt in column 2 analyzed 4.16% titanium.

*Example II*

The conditions of Example I were duplicated, but in this instance 61 parts by weight of $TiCl_4$ in admixture with one part by weight of hydrogen was bubbled through the apparatus. The exit gases, consisting largely of hydrogen chloride in admixture with unused hydrogen and 7.5% of the $TiCl_4$, were led from the towers to an associated absorption apparatus. The sodium chloride in the two columns analyzed 9.82% and 3.60% titanium. The amount of titanium tetrachloride passed into the apparatus was 215 grams and 200 grams were found by analysis to exist in the absorbent salt.

*Example III*

The conditions of Examples I and II were duplicated except that a mixture of titanium chloride and hydrogen richer in titanium chloride was used. 120 parts by weight of titanium tetrachloride was added to each part by weight of hydrogen in this instance with an 80.5% conversion of titanium tetrachloride to lower-valent salts being realized. The salt in the absorption towers was found to contain 10.88% and 4.61% by weight of titanium after the passage of 268 grams of titanium tetrachloride.

*Example IV*

The conditions of the previous examples were duplicated except that the gaseous feed mixture was richer in hydrogen, being 1 part of hydrogen for each 27 parts of $TiCl_4$. A total of 347 grams of $TiCl_4$ was passed through the apparatus, held at 850° C., and a conversion of 81.6% of the titanium tetrachloride was realized. The lower chlorides formed were absorbed in the salt columns. The salt in column 1 contained 8.28% titanium at the start, while the salt in column 2 was pure sodium chloride. At the end of the operation the salt in the columns analyzed 13.8% and 8.5% titanium, respectively.

*Example V*

In this example, employing the apparatus of Example I, 30 parts of titanium tetrachloride were mixed with one part of hydrogen and passed into the columns which were maintained at 750° C. The salts in the columns originally contained 8.51% and 5.04% titanium. At the close of the operation, after passage of 270 grams of $TiCl_4$ had been effected, the salts analyzed 14.4 parts by weight of titanium and 8.99% titanium, respectively. Of the titanium chloride, 59.3% was converted to lower chlorides and absorbed in the salt mixtures.

*Example VI*

In this example, employing the apparatus of Example I, a still lower operating or absorption temperature, 650° C. was used by employing in lieu of pure NaCl a molten salt absorbent containing lower chlorides of titanium, i.e., 7.79% titanium in column 1 and 7.23% titanium in column 2. The feed mixture contained 39 parts titanium tetrachloride per part of hydrogen and a total of 366 grams of titanium tetrachloride was passed into the system as bubbles through the molten salts held at 650° C. Analyses of the products showed a conversion of 25% of the titanium tetrachloride and that the salts in the columns contained 12.05% titanium and 8.63% titanium, respectively.

*Example VII*

A mixture of titanium tetrachloride vapor and hydrogen consisting of 42 parts by weight of the chloride for each part by weight of hydrogen was passed upwardly through a tower packed with silica chips maintained at a temperature of 850° C. and through which was downwardly passed a stream of molten sodium chloride. The molten salt was in an amount of 3 parts by weight for each part by weight of titanium tetrachloride. The packed column was 2 inches in diameter and the rate of flow of sodium chloride was ten pounds per hour. In excess of ninety-seven percent of the titanium tetrachloride was reduced to the subchloride condition and dissolved in the sodium chloride during the contact period in the tower. The resulting solution of titanium subchloride in molten sodium chloride was passed by gravity flow from the tower to a batch reaction chamber where it was reacted at 950° C. with a stream of sodium equivalent to the chlorine content of the titanium subhalide. Immediate reaction took place with the formation of sponge titanium metal and additional sodium chloride. This second stage reduction provided a product similar to the sponge products of prior titanium tetrachloride reductions in which magnesium or sodium were used in the recovery of the titanium metal.

*Example VIII*

A mixture of one part by weight of hydrogen and 57 parts by weight of titanium tetrachloride was preheated to 850° C. and then bubbled through a 4-inch column of molten potassium chloride maintained in an absorption tower 1½" diameter, followed by a similar treatment in a second 8" column also containing molten potassium chloride. Both towers were maintained at a temperature of 850° C. Resultant gases were cooled in a water-cooled condenser, passed through two cold traps packed with Dry Ice, and finally discharged. The amount of $TiCl_4$ used in the run was 180.8 grams and was charged to the system over a period of 56 minutes. The salt increased in weight by 137 grams and the $TiCl_4$ was reduced completely to the subchloride state and dissolved in the potassium chloride. On analyses, the titanium subchloride was found to contain a chlorine content of 2.8 atoms for each atom of titanium. The salt of the first tower was found to contain 12.9% titanium and of the second tower 2.2% titanium. Obviously, greater amounts of titanium could be absorbed in the potassium chloride of the two towers. From these results it is clear that potassium chloride is a more effective absorbent for the subchlorides of titanium than is sodium chloride.

*Example IX*

A mixture of one part by weight of hydrogen and 62 parts of vaporous titanium tetrachloride was preheated to 850° C. and then bubbled through molten lithium chloride held at 850° C. exactly in the manner of Example VIII. The exiting gases were cooled as before, i.e., passed through two cold traps packed with Dry Ice and finally discharged. 160.4 grams of titanium tetrachloride were passed into the apparatus during a period of 46 minutes. The salt increased in weight 63.6 grams and 63.7% of the titanium tetrachloride charged to the apparatus was found in the lithium chloride. The salt product analyses showed the ratio of chlorine to titanium to be 2 chlorine atoms for each titanium atom. From the experiment, lithium chloride proves to be a good solvent for the dichloride, but a poor solvent for the trichloride of titanium. The titanium content of the salt in the first tower was found to be 5.5% while in the second tower it was 3.1%.

These results show that lithium chloride can be effectively used as a solvent when segregation of titanium dichloride is desired, but that it is not as effective as sodium or potassium chloride when absorption is to be effected without regard to the composition of the subchloride.

*Example X*

Employing a silica column of the type referred to in Example VII, 200 grams of pure magnesium chloride was charged to such column. A mixture of 40 parts by weight of titanium tetrachloride per part by weight of hydrogen was passed through the column while the temperature of the column was maintained at 800° C. A total of 86.3 grams of titanium tetrachloride was introduced over a period of three hours. During the run, the magnesium chloride was observed to darken in color as the solution of lower chlorides of titanium in the salt was produced. At the conclusion of the run it was found by analysis that 3.8 g. of the titanium tetrachloride was converted to lower chlorides and absorbed in the salt.

The recovered solution of titanium lower chlorides in magnesium chloride was placed in a metal reaction vessel equipped with an agitator and an inert gas purging system and heated in a furnace to 800° C. to melt the charge. Seven grams of magnesium in the form of cubes of ¼" diameter were added to the melt while the melt was being stirred. At the completion of the magnesium addition, the salt was cooled to room temperature and leached with water to dissolve the magnesium chloride. The titanium metal product was in the form of a fine grained particulate sponge in a yield of 68 percent based upon the titanium values in the salt mixture.

*Example XI*

Employing a single column type of apparatus containing 190 g. of the NaCl—KCl eutectic mixture (50–50 mol. percent) maintained at 850° C., a mixture containing 3 parts by weight niobium pentachloride per part by weight hydrogen was passed through the column, a total of 60 g. of $NbCl_5$ being introduced into the column.

At the conclusion of the run, 82% of the $NbCl_5$ was found to be converted to lower chlorides and absorbed in the salt within the column.

A 47 gram portion of the salt composition thus prepared (containing 7.5 g. of lower chlorides of niobium) was mixed with 4.45 g. of a zinc-magnesium alloy containing 59.2% zinc. The mixture was placed in a alumina crucible within a tubular (Vycor) reaction vessel and the tube was flushed with argon. The charge in the tube was then heated to 750° C. and held at that temperature for one hour. After cooling, the salt cake product was removed from the crucible, broken up, and leached with 6 N HCl for one hour. The product was then vacuum-distilled at 1300° C. for four hours. The resultant metal product analyzed 99.96% Nb.

Another 47 g. portion of the salt composition thus prepared (containing 7.5 g. of the lower chlorides of niobium) was melted and filtered through a fritted silica disc. The filtered ingot was transferred to an alumina crucible in a Vycor tube and the apparatus assembled and flushed with argon. The temperature of the apparatus was then raised to 700° C., and 1.82 g. magnesium were added with stirring, over a 10 minute period. After an additional 5 minute heating period at 700° C. the resulting reaction product mixture was cooled and leached with 6 N HCl to recover the niobium formed. The metal was obtained in 95% yield on the niobium in the salt composition, and was analyzed as 99.5% niobium.

*Example XII*

In a column type apparatus described in Example XI, 54 grams of LiCl—KCl eutectic were placed. While maintaining the column at a temperature of 700° C., a mixture of three parts by weight of $NbCl_5$ per part by weight of hydrogen was passed through the column until a total of 52 g. of $NbCl_5$ had been introduced. At the conclusion of the run, the salt cake was found to weigh 72 g. and hence contained 18 g. of lower chlorides of niobium.

After cooling, 44 g. of the resulting salt composition (containing 11 grams of lower chlorides of niobium) was placed in an alumina crucible in an argon atmosphere, and reduced with agitation using 4.0 g. sodium. After reduction, the salt cake was cooled and was subjected to vacuum distillation at 1000° C. for 6 hours. The metal recovered analyzed 98.7% niobium.

The remaining 28 g. of the salt composition prepared above (containing 7 grams of lower chlorides of niobium) was reduced in an alumina crucible, under argon, at 675° C., using 1.14 g. of aluminum. After holding at temperature for 1 hour, the entire salt cake was vacuum distilled at 1000° C. for 6 hours. The resulting metal product analyzed 99.5% niobium and 0.07% aluminum. The yield of niobium on the lower valent chlorides present in the salt cake was 88%.

In the first of the three above examples, it was observed that during the first half hour of operation virtually 100% of the titanium tetrachloride was converted to the lower-halide salt as evidenced by the absence of $TiCl_4$ in the exit gases vented. After ½ hour of operation under conditions as given, a slight decrease in the conversion of $TiCl_4$ to lower halide was observed, as the concentration of lower halide in the molten salt increased. It is pointed out that temperatures above 650° C. should be employed when rapid conversion of the titanium tetrachloride or other refractory metal halide used is desired. The selection of temperatures, ratio of titanium chloride to hydrogen and the like are subject to variation, and the conditions suitable for any particular type of absorption apparatus can be readily selected for a given operation. The reduced titanium or other metal chloride product combined with the molten alkali metal chloride, which does not necessarily have to be sodium chloride, but can comprise other alkali or alkaline earth metal halides, such as lithium chloride, potassium chloride, or mixtures of any of the alkali metal chlorides, iodides, bromides, etc., magnesium chloride, calcium chloride, barium chloride, or other alkaline earth metal chlorides, iodides or bromides, either alone or in admixture with alkali metal chlorides. Hence, the term "alkali and alkaline earth metals" as used herein is generic to all such metal halides.

While specific metal polyhalides have been mentioned or utilized herein, the invention is not restricted thereto. Use is generally contemplated of a halide (chloride, bromide, or iodide) of the metals titanium, vanadium, niobium, tantalum, molybdenum and tungsten which upon reduction with hydrogen produce my novel subhalide-salt composition. Examples of such halides include titanium tetrachloride, bromide or iodide, niobium pentachloride or bromide, molybdenum tetrachloride or bromide, vanadium tetrachloride, tantalum pentachloride or bromide, tungsten hexachloride, etc. Again, while specific subhalide salts of the refractory metals mentioned have been indicated as preferred for use, the various subhalide salts, e.g., chlorides, bromides and iodides of the metals mentioned are contemplated for production. Among examples thereof may be mentioned titanium trichloride, titanium dichloride, dibromide, diiodide, niobium tri- or dichloride or bromide, vanadium trichloride or bromide, vanadium dichloride, molybdenum trichloride, molybdenum dichloride or bromide and tungsten tetra- or dichloride, bromide, etc. It will also be understood that the alkali metal halide solvent need not be in completely molten state when added to the system, e.g., such solvent can be fed to the system in solid form provided the temperature of operation is above the melting point of the product obtained by interaction or solution, of subchloride with solid metal halide.

While resort to semi-continuous methods has been effected in the above experiments, the process is also suited for continuous operations. Thus, the mixed gases can be passed continuously into the absorption towers to which the molten salt mixtures can be also continuously fed. Obviously, the sodium chloride or other metal chloride can be fed into the top of the towers, either as a solid or liquid, and the liquid salt containing the refractory metal withdrawn from the bottom of such towers. The salt containing the lower chlorides melts at a lower temperature than the pure salt, and heat will be consumed in melting the salt in case it is added as a solid. The sensible heat necessary to reach reaction temperature is substantial and additional heat may be required. Accordingly, under such circumstances, it may be necessary to externally heat the towers or the feed materials in accordance with conventional techniques to maintain proper reaction temperature therein. Similarly, the liquid reaction product can be withdrawn continuously from the primary reduction stage to a second reactor maintained at from 750–1100° C. wherein it is further reduced under an inert atmosphere, such as of a rare gas (argon, helium, neon), if desired, with an active reducing metal such as sodium or other alkali metal, magnesium, calcium, or other alkaline earth metal, in accordance with known titanium metal-producing operations, including those set forth in said Patents 2,205,854 and 2,148,345. These reducing agents which have greater combining activity than titanium, complete the reduction of the titanium chloride to the metal stage, using stoichiometric amounts of reducing agent. Reducing agents which may be used in this invention include sodium, lithium, rubidium, cesium and potassium, calcium, barium, strontium, zinc, aluminum and alloys of these metals.

The refractory metal subhalide-salt composition from this invention possesses great stability. It is much more resistant to oxidation than the simple subhalides of the metals and it may be kept heated and may be transported as a liquid.

Various methods which have been proposed for the reduction of the pure titanium tetrachloride may also be employed for the reduction of the refractory metal-salt compositions of this invention. The reducing metals may be dropped onto the surface of the salt reactant as liquids or as solids, and a sponge product readily obtained. It should be noted that the reaction in this instance does not release as great an amount of heat as would be the case if the whole reduction were carried out in one step. Accordingly, the process has this definite advantage as well as making possible the use of a cheaper reducing agent for the more expensive metal reducing agent.

The titanium subhalide-salt composition which is one of the preferred refractory metal subhalide-salt compositions herein described can be used as a source of a reduced titanium chemical in the textile industry, as a stripping agent in the leather industry, or as an intermediate for the production of titanium metal. The salt melts without decomposition, is relatively stable in the air, and there is no danger of spontaneous combustion as is encountered with the normal subhalides of titanium. The product may be shipped in drums or other containers which preserve its purity and solutions may be prepared therefrom by adding thereto a suitable solvent, e.g., water. It is also useful for the electrolytic preparation of titanium.

I claim:

1. A method for producing a stable, low-melting subhalide salt of a metal selected from the group consisting of titanium, niobium, tantalum, molybdenum, vanadium and tungsten which comprises reacting with hydrogen at a temperature of at least 450° C., a normal halide of said metal within a closed reaction zone and while in contact with an absorbent molten halide of a metal selected from the group consisting of alkali and alkaline earth metals to form a homogeneous composition made up of said subhalide and said absorbent molten halide, and recovering said composition by-product hydrogen halide formed in the reaction.

2. A method for producing a stable, low-melting subhalide salt of a metal selected from the group consisting of titanium, niobium, tantalum, molybdenum, vanadium and tungsten which comprises reacting with hydrogen at a temperature ranging from about 450–850° C., a normal halide of said metal, within a closed reaction zone and while in contact with an absorbent molten solvent salt of a metal selected from the group consisting of alkali and alkaline earth metals to form a homogeneous composition made up of said subhalide and said absorbent molten halide, and recovering said composition from the by-product hydrogen halide formed in the reaction.

3. A method for producing a stable, low-melting subchloride salt of a metal selected from the group consisting of titanium, niobium, tantalum, molybdenum, vanadium and tungsten which comprises reacting with hydrogen, at a temperature of at least 450° C., a normal chloride of said metal within a closed reaction zone and while in contact with an absorbent molten chloride of a metal selected from the group consisting of alkali and alkaline earth metals to form a homogeneous composition made up of said subchloride and said absorbent molten chloride, and recovering said composition from the by-product hydrogen chloride formed in the reaction.

4. A method for producing a stable, low-melting subchloride salt of titanium which comprises reacting, at a temperature ranging from 450° C. to 850° C., titanium tetrachloride and hydrogen within a closed reaction zone and in contact with an absorbent molten chloride of a metal selected from the group consisting of alkali and alkaline earth metals to form a homogeneous composition made up of said subchloride and said absorbent molten chloride, and recovering said composition from the by-product hydrogen chloride formed in the reaction.

5. A method for producing a stable, low-melting subchloride salt of niobium which comprises reacting, at a temperature ranging from about 450° C. to 850° C., niobium pentachloride and hydrogen within a closed reaction zone and in contact with an absorbent molten chloride of a metal selected from the group consisting of alkali and alkaline earth metals to form a homogeneous composition made up of said subchloride and said absorbent molten chloride, and recovering said composition from the by-product hydrogen chloride formed in the reaction.

6. A method for producing a stable, low-melting titanium subchloride salt which comprises adding titanium tetrachloride and hydrogen to a reaction zone for reaction therein while in direct contact with an absorbent molten alkali metal chloride, maintaining said zone at a temperature in excess of the melting point of said alkali metal chloride but below the boiling point of the resulting titanium subchloride salt, and withdrawing the resulting homogeneous composition made up of said absorbent molten alkali metal chloride and said subchloride of titanium from said zone while simultaneously removing gaseous hydrogen chloride formed in the reaction.

7. A method for producing titanium metal from a stable, low-melting subchloride of titanium which comprises charging titanium tetrachloride and hydrogen into a reaction zone maintained at a temperature ranging from about 750–850° C. for reaction therein while in contact with a bed of a molten absorbent alkali metal chloride solvent for the subchloride of titanium which resultingly forms, withdrawing the homogeneous titanium subchloride-alkali metal chloride composition which forms from said zone and charging it into a second reaction zone containing an alkali metal reducing agent, reducing the titanium content of said composition to the elemental form in said second zone and recovering the titanium metal product from its by-product alkali metal salt.

8. A method for producing niobium metal from a stable, low-melting subchloride of niobium which comprises charging niobium pentachloride and hydrogen into a reaction zone maintained at a temperature ranging from about 750 to 850° C. for reaction therein while in contact with a bed of a molten absorbent alkali metal chloride solvent for the subchloride of niobium which resultingly forms, withdrawing the homogeneous niobium subchloride-alkali metal chloride composition which forms from said zone and charging it into a second reaction zone containing an alkali metal reducing agent, reducing the niobium content of said composition to the elemental form in said second zone and recovering the niobium metal product from its by-product alkali metal salt.

9. A method for producing titanium metal which comprises introducing titanium tetrachloride and hydrogen into a closed reaction zone maintained at a temperature ranging from 750 to 850° C. for reaction therein while in contact with sodium chloride supplied thereto as a solvent for the subchloride of titanium resulting from the titanium tetrachloride-hydrogen interaction, withdrawing the homogeneous titanium subchloride sodium chloride composition obtained in said reaction zone and charging it into a second reaction zone for reaction with sodium to convert its titanium content to titanium metal, and recovering the titanium metal by separating therefrom its sodium chloride salt impurity.

10. A method for the production of titanium metal which comprises introducing titanium tetrachloride and hydrogen into a reaction zone maintained at a temperature of from 750–850° C. for reaction therein while in contact with sodium chloride supplied thereto as a solvent for the subchloride of titanium resulting from the interaction of the titanium tetrachloride with hydrogen, withdrawing the homogeneous complex chloride reaction product composition obtained from said zone into a second reaction zone for reaction with molten magnesium to convert the titanium content thereof to the elemental titanium state, and recovering the titanium metal product from the reaction product obtained in said second reaction zone by separating it from its by-product mixed salts.

11. A method for the production of titanium metal which comprises introducing titanium tetrachloride and hydrogen into a reaction zone maintained at a temperature of from 750–850° C. for reaction therein while in contact with potassium chloride supplied thereto as a solvent for the subchloride of titanium which results from the interaction of the titanium tetrachloride with hydrogen, withdrawing from said zone the homogeneous titanium subchloride-potassium chloride composition thus formed and charging it into a second reaction zone for reaction therein with molten potassium and to convert its titanium content to the elemental state, and recovering the titanium metal product from the reaction product of said second zone by separating said product from its by-product potassium chloride salt impurity.

12. A continuous method for the production of titanium metal which comprises continuously adding titanium tetrachloride and hydrogen to a reaction zone maintained at a temperature ranging from 750 to 850° C. for reaction therein while in contact with a molten body of an alkali metal chloride maintained in said zone and to form a homogeneous composition made up of said subchloride and said molten chloride, continuously withdrawing said composition from said zone and charging it into a second reaction zone for reaction, at temperatures ranging from about 750–1100° C. with an alkali metal reducing agent and conversion of its titanium content to the elemental state, and recovering the titanium metal product from the reaction product obtained in said second reaction zone by separating it from its by-product salt impurity.

13. A method for producing a metal selected from the group consisting of titanium, niobium, tantalum, molybdenum, vanadium and tungsten which comprises forming a stable, low-melting subhalide salt of said metal by reacting at a temperature ranging from about 450–850° C. a normal halide of said metal with hydrogen within a closed reaction zone while in direct contact with an absorbent molten halide of a metal selected from the group consisting of alkali and alkaline earth metals and to form a homogeneous composition made up of said subhalide and said absorbent molten halide, recovering from said zone the metal subhalide-salt composition which results and subjecting it to reduction at temperatures ranging from 750–1100° C. in a second reaction zone with an active reducing metal, and recovering the metal product formed in said second zone from the metal halide salt by-product formed during said reduction.

14. A method for producing a stable, low-melting subhalide salt of niobium which comprises reacting with hydrogen at a temperature ranging from about 450–850° C. a normal halide of said metal within a closed reaction zone and while in contact with an absorbent molten chloride of a metal selected from the group consisting of alkali and alkaline earth metals to form a homogeneous composition made up of said subhalide and said absorbent molten chloride, and recovering said composition from the byproduct hydrogen halide formed in the reaction.

15. A method for producing niobium metal which comprises forming a stable, low-melting subhalide salt of said metal by reacting with hydrogen at a temperature ranging from about 450–850° C., a normal halide of said metal, within a closed reaction zone, effecting said reaction while the reactants are brought in contact with an absorbent molten chloride of a metal selected from the group consisting of alkali and alkaline earth metals to form a homogeneous composition made up of said subhalide and said absorbent molten chloride, subjecting said composition to reduction at temperatures ranging from 750–1100° C. with an active reducing metal within a separate reaction zone, and recovering the niobium product from the metal halide salt by-product formed during said reduction.

References Cited in the file of this patent

UNITED STATES PATENTS

| | | |
|---|---|---|
| 1,173,012 | Meyer et al. | Feb. 22, 1916 |
| 2,205,854 | Kroll | June 25, 1940 |
| 2,443,253 | Kroll et al. | June 15, 1945 |
| 2,607,674 | Winter | Aug. 19, 1952 |
| 2,670,270 | Jordan | Feb. 23, 1954 |
| 2,703,752 | Glasser et al. | Mar. 8, 1955 |
| 2,706,153 | Glasser | Apr. 12, 1955 |

OTHER REFERENCES

Maddex et al.: Journal of Metals, April 1950, pages 634–640.